(12) United States Patent
Ferri

(10) Patent No.: US 6,323,662 B2
(45) Date of Patent: Nov. 27, 2001

(54) DEVICE FOR THE PRECISE MEASUREMENT OF MAGNITUDES AND METHOD OF VERIFICATION OF CORRECT FUNCTIONING OF THE DEVICE

(75) Inventor: Angelo Ferri, Mirandola (IT)

(73) Assignee: B. Braun Melsungen AG, Melsungen (DE)

( * ) Notice: Subject to any disclaimer, the term of this patent is extended or adjusted under 35 U.S.C. 154(b) by 0 days.

(21) Appl. No.: 09/846,613

(22) Filed: May 2, 2001

Related U.S. Application Data

(63) Continuation-in-part of application No. 09/336,726, filed on Jun. 21, 1999, now abandoned.

(30) Foreign Application Priority Data

Jun. 26, 1998 (IT) ............................................. MO98A0143

(51) Int. Cl.7 .................................................. G01R 17/10
(52) U.S. Cl. ............................................................ 324/725
(58) Field of Search .................................... 324/706, 710, 324/725; 73/708, 720, 726, 727; 340/584, 660, 661, 662, 663

(56) References Cited

U.S. PATENT DOCUMENTS

| 3,784,906 | | 1/1974 | Ironside . | |
| 4,798,093 | * | 1/1989 | Kenoun | ................................ 73/708 |
| 5,419,199 | * | 5/1995 | Araki | .................................... 73/708 |

* cited by examiner

Primary Examiner—Safet Metjahic
Assistant Examiner—E P LeRoux
(74) Attorney, Agent, or Firm—Diller, Ramik & Wight

(57) ABSTRACT

The improved device for precise measurement of magnitudes includes a closed network circuit, an instrument for detecting malfunctions in the closed network circuit and means for outputting an indication of the balance of the closed network circuit. The closed network circuit includes a power source; a transducer in the form of a Wheatstone bridge that is defined by paired series resistors and defines a branch of the closed network circuit and the transducer is serially connected to the power source; and a resistive branch connected in series to the Wheatstone bridge. The instrument is connected to a first connecting point in the resistive branch and to second and third connecting points on the Wheatstone bridge. The instrument calculates a sum of the potential differences between the second and third connecting points and the first connecting point and outputs the summed potential differences.

11 Claims, 1 Drawing Sheet

DEVICE FOR THE PRECISE MEASUREMENT OF MAGNITUDES AND METHOD OF VERIFICATION OF CORRECT FUNCTIONING OF THE DEVICE

CROSS-REFERENCE TO RELATED APPLICATIONS

This application is a Continuation-in-Part (CIP) application of U.S. patent application Ser. No. 09/336,726, filed Jun. 21, 1999 now abandoned.

BACKGROUND OF THE INVENTION

The present invention relates to an improved device for precision measurement of magnitudes and a method to verify the correct functioning of the device.

Devices for accurate measurements of magnitudes, such as measurements of pressure and force, have been available on the market for some time.

Such devices are better known as transducers and are essentially composed of electrical circuitry, configured as a Wheatstone bridge, in which the circuit resistors, usually known as extensometers, are fixed, usually glued, to a laminar base, usually made of steel, which is deformable, according to an elastic constant.

Because of this characteristic, every time a deformation of the base occurs, due to load stress, a proportional variation of the absolute value of one or more resistors and the measurement of such differential value, caused by the modification, when correctly interpolated, gives the measurement of the value required.

However, such known transducers are subjected to faults and malfunctioning which affect their precision, hence their reliability.

Faults in the manufacturing process or accidental collisions or knocking of the devices can cause a progressive detachment of one of the resistors, or the partial detachment of the base, which in turn will cause the modification of its absolute value, with subsequent wrong reading of the measured magnitude.

However, if it is of a macroscopic order, the wrong reading can be easily detected because in activating the transducer in discharge configuration, it must display the reference value set by the manufacturer. This value, starting from the "zero" origin value, takes into account the sensitivity set by the manufacturer of all the elements of which the transducer is made and, as stated above, if the difference between the expected value and the value effectively found is excessive, it means that the transducer is damaged beyond repair and must be replaced.

On the other hand, if the reference value is verified before the start-up of the transducer, this does not necessarily mean that the transducer is intact and reliable.

The anomaly can appear after the installation of the transducer, and, therefore, the anomaly cannot be detected.

In this latter case, it can be quite dangerous in those circumstances in which the transducer is used in machines in a medical environment. For example, when the transducer is an integral part of a machine that automatically controls volumes of liquid medicinals to be infused or exchanged in a patient.

More precisely, for therapies such as dialysis, these transducers are used to weigh bags containing medicinal solutions that are to be progressively infused into the patient over a predetermined period of time with a predetermined and precise volume of these solutions, vis-a-vis of a similarly programmed subtraction of fluids drained from the patient.

A malfunction of the transducer that occurs during the treatment can put the patient in severe danger, because the actual administration or the subtraction of solution will have different values from those originally programmed. As a result, the originally programmed administration or subtraction can run out-of-control and not be detected until the end of the treatment, after the patient has already suffered physical damage.

Current attempts to eliminate such problems and to avoid the risk related to them include, for example, procedures to verify the correct functionality of the electronics by modifying, at programed intervals, the transducer's signal output. However, this verification does not provide information on the state of structural wear and tear of the transducer internal circuitry.

Thus, a transducer malfunction could be interpreted as an incorrect application of the therapeutic treatment, and it would be corrected automatically, paradoxically worsening the patient's condition.

The second method of verification of correct functioning of the device involves coupling two transducers, which control each other, and intervene in case of malfunctioning of one of the two, to interrupt the treatment or to reset it to preset values.

This, however, implies the availability of supplying machines with two transducers, with the inconvenience that the cost of the extra device will heavily affect the overall cost of the machines, limiting their diffusion and the capacity of the therapeutic treatments.

Furthermore, the methodology used for coupling the two transducers, due to the natural deviation between them and to the instability of the anchorage between them, causes further and greater errors.

SUMMARY OF THE INVENTION

The technical purpose of this invention is to solve the problems of the known technology, described earlier, by providing an improved device for the precision measurement of values, which allows, even with the installation of a single device, self-diagnosis of correct functioning during the whole time in which the device is utilized.

These and other objectives are achieved with an improved device for precise measurement of magnitudes which is characterized by a closed network circuit, a branch of which is constituted by at least a Wheatstone bridge serially connected with a power source, and connected in parallel with a resistive branch, that includes at least two resistors linked in series and between which is defined a first connecting point for a bipolar instrument of measurement of potential, and also of a second connecting point and a third connecting point of the instrument that are located on the branches of the Wheatstone bridge.

The method of verification of correct functioning of the improved device for the precise measurement of values has the advantageous feature of measuring potential differences between the first and the second connecting points and between the first and third connecting points, and of being capable of mathematically correlating between these differences of measured potentials, and in verifying that this mathematical correlation results in a value equal to an expected pre-settable reference value.

With the above and other objects in view that will hereinafter appear, the nature of the invention will be more

DETAILED DESCRIPTION OF THE INVENTION

Figure 1:
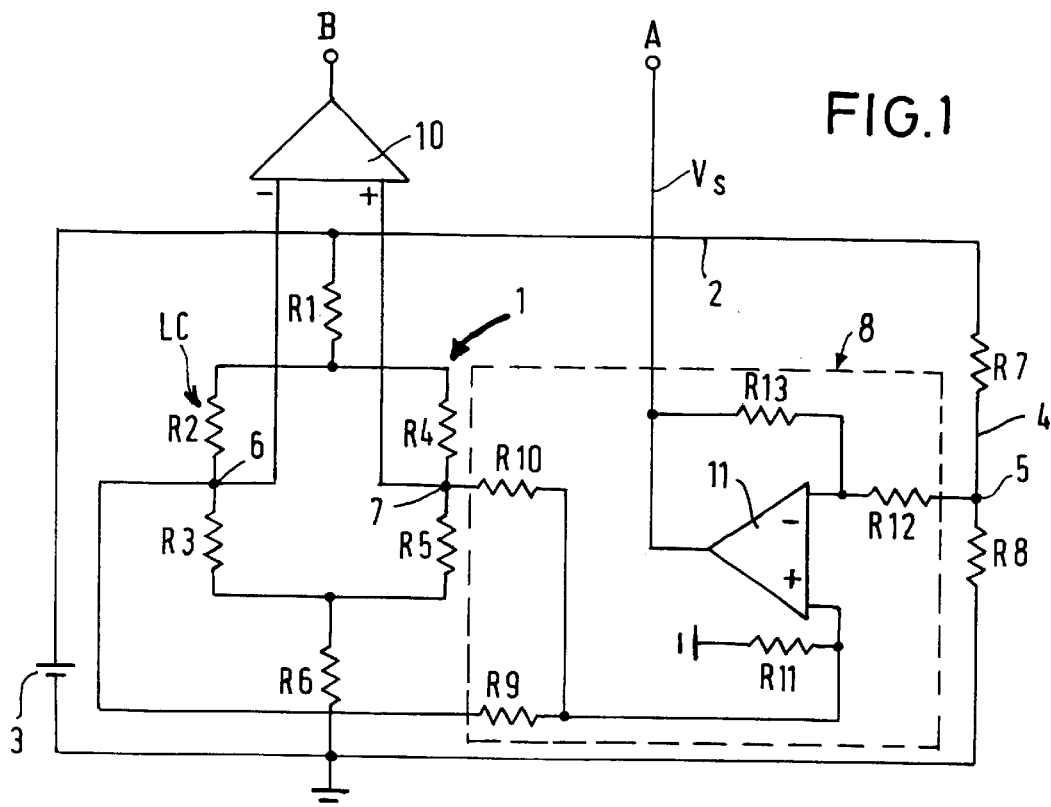
FIG. 1 shows the preferred scheme circuit for the making of the improved device for the precise measurement of values.

In FIG. 1, a transducer 1 for the precise measurement of values is included in a closed network circuit 2.

A branch of the closed network circuit 2 includes a Wheatstone bridge including four resistors R2, R3, R4, R5 of known values. All of the Wheatstone bridge resistors are arranged to form a load cell LC. The electrical resistances of the resistors vary in accordance with a mechanical force acting on the load cell LC. If the load cell LC is unloaded, the Wheatstone Bridge is balanced. When the Wheatstone Bridge is balanced, the potentials on the second and third connecting points 6, 7 are equal so that there is no voltage difference between the second and third connecting points 6, 7. If a mechanical force acts on the load cell LC, the resistances of R2 to R5 change and a voltage appears between the second and third connecting points 6, 7, which causes the Wheatstone bridge to become unbalanced.

The Wheatstone bridge is connected at one end to a series resistor R1, and at an opposite end with another series resistor R6. The resistors R1 and R6 are, in turn, connected to the terminals of a power source 3, such as a battery.

The second connecting point 6 of the Wheatstone bridge is connected to a negative input of a differential amplifier 10 and the third connecting point 7 of the Wheatstone bridge is connected to a positive input of the differential amplifier 10. If both potentials on the second and third connecting points 6, 7 are equal, the output B of the differential amplifier 10 is zero. However, if the Wheatstone bridge is unbalanced, the output B is different from zero, dependent upon the degree of imbalance.

Figure 2:
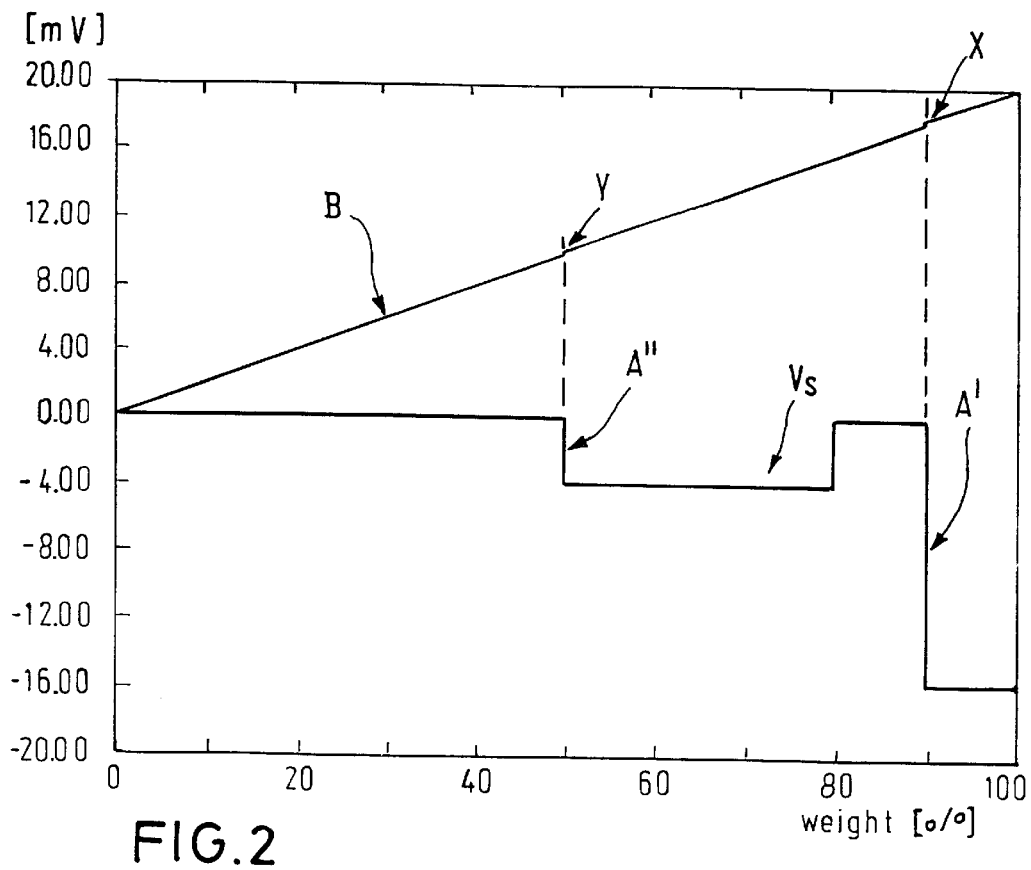
FIG. 2 shows the Cartesian diagram having for coordinates the intensity in millivolts of the potential difference detectable with an appropriate bipolar instrument which is realized by the device according to the invention, and to the percentage of load applied to the transducer and to the characteristic offset curve of the device, according to the invention, which was caused by damage to the transducer and produced the subsequent typical response curve.

FIG. 2 shows a graph. Along the abscissa, the weight acting on the load cell LC is indicated in percent of the maximum weight. Along the ordinate, the output voltage of the signal B of the differential amplifier 10 is indicated in millivolts (mV). The graph shows that the output B is generally proportional to the weight acting on the load cell LC.

In FIG. 1, the Wheatstone bridge is shown connected in parallel to a resistive branch 4, which includes two resistors R7, R8 connected in series and being of identical values. Between these two resistors R7, R8 is defined a first connecting point 5 to be connected to an instrument 8.

The instrument 8 enables the detection of malfunctions of the transducer 1, particular of the Wheatstone bridge, even if the malfunction is extremely small. Such functions can arise, for example, if the epoxy resin covering one of the resistors of the Wheatstone bridge cracks or breaks. In such a case, the value of the resistance can change by only a few percent, thus causing the Wheatstone bridge to become unbalanced.

For detecting such relative variations of the Wheatstone bridge, the instrument 8 is provided. The instrument 8 has a first resistor R9 connected to the second connecting point 6 of the Wheatstone bridge and a second resistor R10 connected to point 7 of the Wheatstone one bridge. The other ends of the first and second resistors R9, R10 are connected to a positive input of another differential amplifier 11. A third resistor R11 is connected at one end to mass potential of battery 3 and at the other end to a positive input of the another differential amplifier 11. Thus, the first, second and third resistors R9, R10, R11 form a summming circuit for forming the sum $V_6+V_7$, wherein $V_6$ is the potential of the second connecting point 6 and $V_7$ is the potential of the third connecting point 7.

A negative input of differential amplifier 11 is connected through a resister R12 to the first connecting point 5 between resistors R7 and R8. A feedback resister R13 is connected between an output and the negative input of the another differential amplifier 11.

The realization of the method according to the present invention occurs through transducer and the voltage $V_s$ at an output A of the instrument 8 can be expressed according to the following formula:

$$V_s=[(V_6-V_5)+(V_7-V_5)]K,$$

where K is a constant that represents the gain of the instrument 8.

This formula can be rewritten as:

$$V_s=[(V_6+V_7-2V_5]K,$$

where $V_s$ has to be equal to zero or to be between a range of preset minimum and maximum values.

$V_5$, $V_6$ and $V_7$ are voltages at first, second and third connecting points 5, 6, 7, respectively. $V_s$ has to be equal to zero or lower than a predetermined reference value $V_{ref}$.

If there arises a crack in one Wheatstone bridge resistor causing a very small deviation of the signal B in FIG. 2, as shown at point X, such a small deviation causes a high jump A' of the output signal $V_s$. Another break Y, which is so small that it is hardly able to be seen, in the curve B causes a jump A1" of the output signal $V_s$.

The constant K depends from the resistor values R9, R10, R11, R12 and R13. By changing the constant K, it is possible to increase the sensitivity of the instrument to enable the detection of small deviations in the load cell or the transducer.

The instrument 8 is a small analog computer. The same function can be realized with other circuitry, for example, by a computer.

The invention enables continuous monitoring of the integrity of the Wheatstone bridge resistors and is capable of detecting very small malfunctions in a single Wheatstone bridge resistor. This insures that the circuitry is highly suitable for use in medical apparatuses requiring extremely high accuracy in the values measured by a transducer.

If a malfunction condition is detected while the transducer 1 is in use, a machine utilizing the transducer will continue to work without any interruption. In case of damage or fault of the transducer 1, for instance, caused by either a total or partial detachment of one of the four resistors R2 to R5, the correct absolute value will change, thus throwing off-balance the circuit constituting the transducer 1, that is, the Wheatstone bridge. The device 1 which continuously monitors the expected value $V_s$, will detect this unbalance, even if the absolute value of the unbalance is very low, for example, on the order of a few thousandth of the nominal precision of the transducer. To this effect, it should be noted that the sudden rise in curve $V_s$, in FIG. 2, can be caused by creating a malfunction in only one of the transducer's four resistors R2, R3, R4, R5, in FIG. 1, of a magnitude equal to one percent (1%) of the maximal basic variation of the related scale.

The accuracy monitoring signal $V_s$ is linearly proportional to the fault or error of the Wheatstone bridge and is used to determine whether the output signal of the Wheatstone bridge is tolerable, any time during the operation of the Wheatstone bridge.

The above fault value of one percent (1%) will produce an error of 0.25 percent (0.25%) only in the nominal precision in the basic value of the transducer scale in curve B of FIG. 2.

The following sudden rise in the curve A' is of an example of the magnitude of the fault which, in this case is equal to four percent (4%) of the maximum variation of the bottom value of the scale of one of the aforesaid resistors. This, in turn, will cause a one percent (1%) precision error in the transducer 1.

In FIG. 2, the characteristic curve B represents the normal detection curve of the transducer response that is used according to the prior art and, which is not capable of detecting significant response values that are close to the values of the anomalies mentioned above. Therefore, if curve B is used as a reference curve, the machine utilizing the transducer will be functioning with a "hidden" error, and if this machine were to be used in a medical/therapeutical environment, it would be dangerous for the patients. This would be especially true if the treatments to be administered were to be continued for several days.

If the absolute value of the curve $V_s$ (algebraically positive or negative) exceeds the threshold of a reference value $V_{ref}$, which is preset according to the operating precision required by the machine, the device 1 will send an alarm signal, in any form of a usual alerting means and, because the functioning of the machine is subjugated to the device, this will stop the machine.

If, on the other hand, the value of the curve $V_s$ is within the preset minimum and maximum range of the values, the device will not alter the operation of the machine.

In this way, it has been possible to demonstrate how the described device produces the predetermined results.

Another convenient possibility of using the accuracy monitoring signal $V_s$ on output A is as follows:

$V_s$ can be used in linear combination with the normal transducer's output signal B for automatic correction of the transducer's reading. Thus, an exact measurement's value is obtained despite a small deviation having occurred at the transducer's Wheatstone bridge during the operation.

In case of an error that causes damage at the transducer's Wheatstone bridge, the accuracy monitor signal $V_s$ will reach a saturation level and, thus, will cease to be linearly related to the error. In this case, the accuracy monitor signal $V_s$ can only be used for alarm purposes.

The system is also able to detect the "first fault" of the transducer's Wheatstone bridge, so that only one resistor at a time becomes damaged while the other resistors are considered to operate correctly. As a result, the probability of having more than one resistor damaged at the same time is considered negligible.

Although a preferred embodiment of the invention has been specifically illustrated and described herein, it is to be understood that minor variations may be made in the apparatus without departing from the spirit and scope of the invention, as defined by the appended claims.

What is claimed is:

1. A method of verifying the correct functioning of a device for the precise measurement of values comprising the steps of:

providing a closed network circuit (2);

providing a transducer (1) in the form of a Wheatstone bridge defined by paired series resistors (R2, R3 and R4, R5) defining a branch of the closed network circuit (2);

providing a power source (3) in series with the Wheatstone bridge with the power source (3) being in series with two further resistors (R7, R8) between which is a first connecting point (5) for a bipolar instrument (8) whose potential is to be measured;

providing second (6) and third (7) connecting points between respective pairs (R2, R3 and R4, R5) of the paired series resistors (R2–R5);

measuring the potential difference ($V_6-V_5$) between the second connecting point (6) and the first connecting point (5), and measuring the potential difference ($V_7-V_5$) between the third connecting point (7) and the first connecting point (5);

obtaining a mathematical sum ($V_s$) [where $V_s=[(V_6-V_5)+(V_7-V_5)]K$, with K being a constant] of the measured potential differences; and verifying that the mathematical sum ($V_s$) corresponds to an expected presettable reference value ($V_{ref}$).

2. The method as defined in claim 1 further including the step of presetting an absolute value of the two further resistors (R7, R8).

3. The method as defined in claim 2 wherein the absolute value is substantially equalizable to the relevant components by the two further resistors (R7, R8).

4. The method as defined in claim 2 wherein the absolute value is substantially equalizable to the relevant components by the two further resistors (R7, R8) in part defining a rheostat.

5. The method as defined in claim 1 further including the step of generating an amplified signal indicative of the mathematical sum ($V_s$).

6. The method as defined in claim 1 wherein the expected presettable reference value ($V_{ref}$).

7. The method as defined in claim 1 wherein the expected presettable reference value ($V_{ref}$) is within presettable minimum and maximum values.

8. A precision measurement device comprising:

a) a closed network circuit (2), said closed network circuit (2) including:
   a power source (3);
   a transducer (1) in the form of a Wheatstone bridge defined by paired series resistors (R2, R3 and R4, R5) defining a branch of said closed network circuit (2), said transducer (1) being serially connected with said power source (3);
   a second connecting point (6) between a pair (R2, R3) of said paired series resistors (R2–R5);
   a third connecting point (7) between a pair (R4, R5) of said paired series resistors (R2–R5); and a resistive branch (4) connected in series to said Wheatstone bridge, said resistive branch (4) including:
   two resistors (R7, R8) connected in series, and
   a first connecting point (5) between said two resistors (R7, R8);
b) an instrument (8) for detecting malfunctions in the transducer (1) connected to said first connecting point (5), said instrument (8) further connected to said second connecting point (6) and said third connecting point (7) on said Wheatstone bridge, said instrument (8) including:
   means for calculating a sum of the potential differences measured between said second and third connecting points (6, 7) and said first connecting point (5), and an output for outputting the summed potential differences connected to said calculating means; and
c) means for outputting an indication of the balance of said Wheatstone bridge between said second and third connecting points (6, 7).

9. The device according to claim 8 wherein said means for calculating a sum of the potential differences comprises a differential amplifier (11).

10. The device according to claim 9 wherein said means for outputting an indication of the balance of said Wheatstone bridge comprises a differential amplifier (10) including a negative input being connected to said second connecting point (6) and a positive input being connected to said third connecting point (7).

11. The device according to claim 9 further comprising a negative input of the differential amplifier (11) being connected to the first connecting point (5) and to a feedback loop connected to the output; and a positive input of the differential amplifier (11) being connected to said power source (3), said second connecting point (6) and said third connecting point (7).

* * * * *